Nov. 15, 1966  L. F. GILBERT  3,286,185
FLAME DETECTOR SYSTEM RESPONSIVE TO SPIKE PRODUCED
BY TOWNSEND AVALANCHE OF GLOW DISCHARGE TUBE
Original Filed Nov. 2, 1962  2 Sheets-Sheet 1

INVENTOR.
LYMAN F. GILBERT
BY
Eldon H. Luther

INVENTOR.
LYMAN F. GILBERT

BY

ATTORNEY

United States Patent Office 3,286,185
Patented Nov. 15, 1966

3,286,185
FLAME DETECTOR SYSTEM RESPONSIVE TO SPIKE PRODUCED BY TOWNSEND AVALANCHE OF GLOW DISCHARGE TUBE
Lyman F. Gilbert, Somers, Conn., assignor to Combustion Engineering, Inc., Windsor, Conn., a corporation of Delaware
Continuation of application Ser. No. 235,097, Nov. 2, 1962. This application Oct. 22, 1965, Ser. No. 507,614
15 Claims. (Cl. 328—6)

This application is a continuation of application Serial No. 235,097, filed November 2, 1962, and now abandoned.

This invention relates generally to condition detecting systems wherein the presence or absence of a particular condition is continuously determined. The invention has particular relation to such a detecting system employable for a variety of applications and being organized to insure safe operation insofar as failure of a component of the system is concerned. The invention is further particularly concerned with a flame detection system of the electronic type employing as the sensing element a glow discharge tube or the equivalent responding to energy emitted by the flame.

In accordance with the invention there is provided a condition detecting system of an extremely safe design with the sensor which senses the presence of a particular condition being such as to produce a signal which has a randomly varying repetition rate. This signal is utilized to produce a driving output signal which will actuate suitable indicating mechanisms or the like and which, due to the random variation of the signal caused by the sensing element also has a random variation and with there being means to determine whether a signal other than this driving signal of random operation is present at the output. A preferred embodiment of the invention concerns an improved electronic flame detector wherein a glow discharge tube or the like is employed as the sensing element, being positioned to "sense" the flame and receive as its firing energy photons produced by the flame. This flame detector has a minimum of circuit components and is extremely reliable in this operation being far more sensitive than prior art detectors of the same general type and being designed so that only the detector tube, i.e., the glow discharge tube, need be mounted on the furnace.

The flame detector of the invention includes what may be termed a transmitter that generates a randomly varying pulse signal which is separated from the supply and coupled into what may be termed a receiver as the input signal therefor and with the output or load of the receiver being energized as long as the randomly varying pulse output of the transmitter is produced.

It is accordingly an object of this invention to provide an improved condition sensing device that is extremely safe in operation.

A further object of the invention is to provide an improved electronic flame detection system.

Other and further objects of the invention will become apparent to those skilled in the art as the description proceeds.

With the aforementioned objects in view, the invention comprises an arrangement, construction and combination of the inventive organization in such a manner as to attain the results desired as hereinafter more particularly set forth in the following detailed description of an illustrative embodiment, said embodiment being shown by the accompanying drawings wherein.

Figure 1:
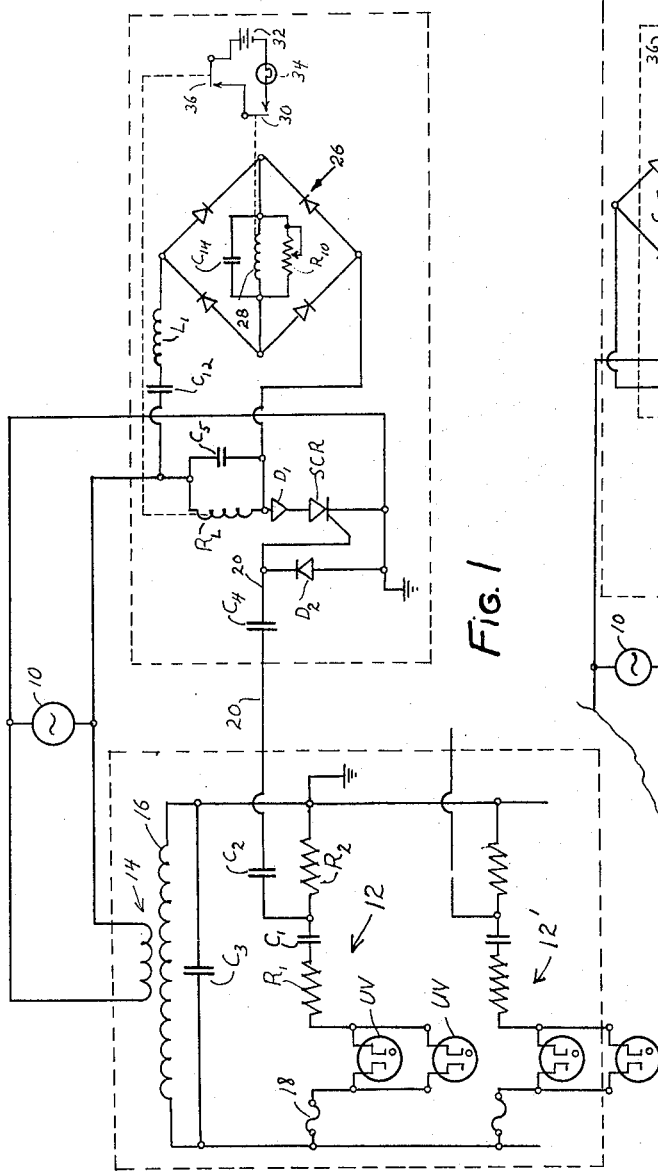
FIG. 1 is a circuit diagram of the present invention.

Referring to the diagram of FIG. 1 there is provided a source of A.C. potential identified as 10 and which is effective to power the transmitter 12 of the flame detector through the transformer 14, with the transformer stepping up the voltage of the source, such as from 118 v. A.C. to 750 v. A.C. The frequency of this supply may be the readily available 60 cycles per second. Connected across the secondary 16 of the transformer are one or more glow discharge tubes UV. In series with this tube UV are fuse 18, resistors $R_1$, and $R_2$, and capacitor $C_1$ ($R_2$ may also be a small transformer or inductor). With this circuit the tube UV is lightly loaded so that it may partially conduct and recover, returning to its high impedance state. The operation thus obtained may be that shown in the FIG. 2 wave form illustrations wherein the voltage spikes are shown riding on the 60-cycle A.C. supply of the UV tube and with these spikes representing the surges or pulses produced incident to firing (avalanche) of the tube. These pulses produce shock excitation of the circuit with the ringing or alternations at the trailing edge of the pulse gradually being damped out.

Figure 2:
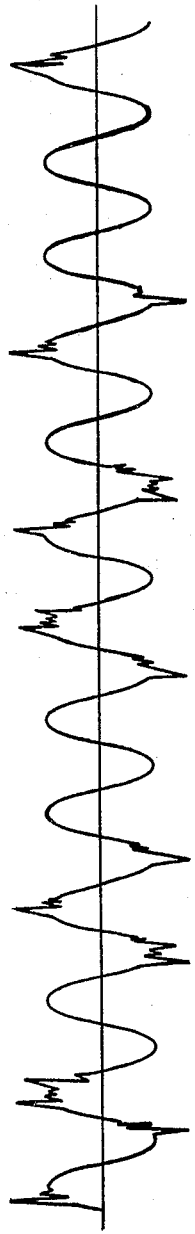
FIG. 2 depicts the wave form produced in the transmitting circuit incident to the firing of the glow discharge tube where the tube is not heavily loaded.

The wave form depicted in FIG. 2 illustrates the UV tube operating out of saturation, i.e., so that firing of the tube is not uniformly effected during every alternation of the supply potential but with a random firing being effected, with this being essential to the present invention in order to produce the random repetition of the pulses. The criterion as to whether or not the tube operates in or out of saturation depends upon its position with relation to the flame being sensed plus the voltage applied to the UV tube. The energy being sensed follows the inverse square law of radiation and therefore the signal strength will vary inversely as the square of the distance between the sensing tube and the flame. The scanning angle which the sensing tube has to view the flame also affects the energy received directly as the square of the diameter of the circle viewed at the point of the flame envelope.

The sensitivity of the tube may also be adjusted by varying the supply voltage to the transmitter circuit by adjusting the supply voltage of transformer 14. Thus in accordance with the present invention the position of the tube relative to the flame being sensed is such and the voltage applied to the tube is such that tube operates out of saturation producing the random firing shown in FIG. 2.

It is found that for the flame produced by gas, oil, or coal firing (or firing of any hydrocarbon fuel), a tube having an energy sensitive spectrum range of from 2000 angstroms to 3300 angstroms operates satisfactorily. The glow discharge tube, i.e., UV, operates on a breakdown mechanism across a threshold potential with what is termed a Townsend avalanche occurring at breakdown. Thus when a photon of proper energy content, i.e., proper wave length, enters the tube it causes ionization of the gases therein resulting in a very rapid acceleration of electrons across the potential gap of the detector tube. In analyzing the operation of the circuit in which the glow discharge tube is disposed it was found that the speed of the pulse produced by the Townsend avalanche and which is reflected back through the circuit (through shock excitation) has a duration of less than .5 microseconds (corresponding to a frequency of better than two megacycles). It was thus determined that this pulse could be readily separated from the supply voltage and employed in the receiver of the flame detector as the input signal therefor thereby rendering the transmission circuit fail-safe with regard to any shorting or opening of the circuit or the components thereof.

Figure 3:
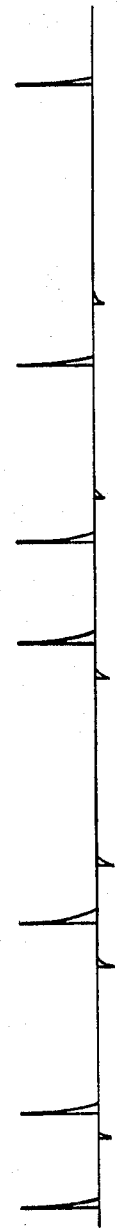
FIG. 3 illustrates the wave form that is the output of the transmitter which is coupled into the receiver as the input therefor.

In the transmitting circuit the RC network established by $R_1$, $C_1$ increases the time during which the very short pulse signal is effective. While this is not essential it does add to the reliability of operation of the circuit. This pulse signal is separated from the 60-cycle supply by means of the separating or filter network identified as $R_2$ and $C_2$. $R_2$ is preferably a wire wound resistor across which a voltage drop is developed by the pulse current established at avalanche ($R_2$ can also be a transformer or inductor). $C_2$ is of such a value as to pass the high frequency pulse while rejecting the 60-cycle source. The separated pulse voltage is thus established between the conductor 20 and ground. FIG. 3 depicts this separated wave form with the negative going pulse being attenuated by shunting to ground through a suitable diode connected to ground for purposes concerned with operation of the receiver as later described. The fuse 18, which may be 1/32 amp., will cause an opening of the transmitter circuit incident to an overload as a result of the developing of a short.

Figure 2A:
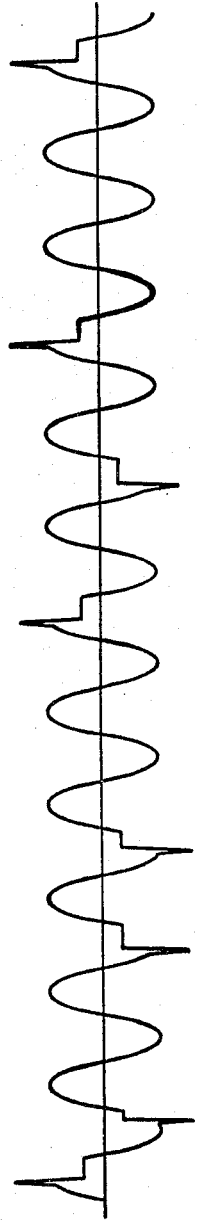
FIG. 2A depicts the wave form produced in the transmitting circuit incident to the firing of the glow discharge tube where the tube is heavily loaded.

In the event that the UV tube is heavily loaded rather than lightly loaded as would be the case if the capacitor $C_1$ were eliminated from the circuit or made very large, then the tube would not be able to recoever after the avalanche and would continue to carry current until the supply voltage dropped below the cut-off level of the tube. FIG. 2A represents the wave form produced in the transmitter under such conditions. The separated signal leaving capacitor $C_2$ would still be of the nature shown in FIG. 3.

The lightly loaded circuit is several times more sensitive than the heavily loaded circuit. In the heavily loaded circuit high energy photons are required to produce sufficient ionization of the gases within the tube to cause an avalanche. In the lightly loaded circuit photons of much lower energy content but of the proper wave length are sufficient to partially ionize the tube thus causing the pulse to be emitted (avalanche) but the tube is capable of recovering and thus does not lose control. The wave form of FIG. 2 illustrates the frequency of operation with a lightly loaded circuit. The wave form of FIG. 2A illustrates the lower frequency of avalanche occurring from the same energy source. It is for this reason that the lightly loaded circuit is preferred thereby taking advantage of the greater sensitivity obtained therewith. However, it is to be understood that the heavily loaded circuit although less sensitive is within the purview of the invention with this circuit distinguishing and separating the signal produced incident to sensing the flame from supply potential of the transmitter.

It is to be understood that pulse signal produced incident to or as a result of avalanche and the generation of pulses incident to avalanche as the expressions are employed in this application means the previously defined pulse or spike produced by the Townsend avalanche and which is reflected back through the circuit as previously explained and does not mean or include the signal produced by the continued conductance of the tube after avalanche and until the supply voltage falls below the cut-off level of the tube which conductance will occur when the tube is heavily loaded.

With this transmitter circuit, should there be a short of the leads to the UV tube, to which prior art organizations have been susceptible, or should there be a short or an opening of any of the components of the circuit the normal pulse signal produced by the transmitter and indicating the presence of a flame will no longer be present wherefore the transmitter is fail-safe or in other words produces a "no flame" signal incident to a malfunction of the circuit. If the UV tube shorts, the pulse signal will no longer be produced and moveover fuse 18 will blow. If $R_1$ and/or $C_1$ short, no detrimental effect will be produced although the duration of the pulse will be decreased and the sensitivity of the circuit will be decreased. If $R_1$ or $C_1$ open, the signal will no longer be produced. If $R_2$ shorts, the signal will no longer be produced through $C_2$ and if $C_2$ shorts, no detrimental effect will be produced unless the corresponding series connected capacitor in the receiver shorts in which case fuse 18 will blow and the signal is no longer produced. Should the transformer short, the signal would no longer be produced.

The transmitter of the flame detector of the invention thus produces a pulse signal of very short time duration which pulse signal is separated from the supply which powers the transmitter and is coupled into the receiver as the input therefor. The transmitter is an extremely simple electrical circuit including the fuse 18, tube UV, $R_1$ $C_1$ forming a pulse shaping or delay network to increase the duration of the pulse and $R_2$ all of which are in series and connected across the secondary 16 of the transformer 14. $R_2$ in cooperation with $C_2$ forms the signal separating network for separating the pulses from the transformer supply potential. Several of the UV tubes may be connected in parallel in a single transmitter with two such tubes being illustrated. This would be desirable when there may be two or more burners or where it is desired to view the flame of a single burner from more than one location.

More than a single transmitter may be operated from the secondary 16 of the transformer. In the illustration of FIG. 1 two transmitters are connected in parallel across the transformer secondary with the second transmitter being identified as 12' and containing the same components as previously described with transmitter 12. This number can be increased so that eight or more flame detectors may be operated from a single transformer if desired. This is of considerable advantage in large furnace installations wherein as many as 24 flame detectors are utilized with a single furnace. When multiple transmitters are employed with a single transformer, the capacitor $C_3$ is connected across the secondary as a filter to prevent the signal spikes of one transmitter from interacting on other signal separators and UV sensing tubes.

Figure 3A:
FIG. 3A illustrates the wave form produced in the receiver through the switching action effected by the pulse output of the transmitter. Also illustrated in dotted lines in FIG. 3 is the integrated wave form that appears across the load or output of the receiver.

The receiver of the flame detector of this invention receives the separated pulse signal from the transmitter as its input signal with the pulse signal actuating a switching device in the receiver and with the receiver being operative to develop a driving or power signal that is applied to a load for activating the same. In the illustrative organization of FIG. 1 the pulse signal output of the transmitter is coupled into the receiver through the capacitor $C_4$ which acts to further filter any 60-cycle supply of the transmitter from the signal with the capacitors $C_2$ and $C_4$ providing a safety feature in that satisfactory operation may be obtained if one of these two capacitors should become shorted. The supply potential for the receiver in this illustrative embodiment is a half wave supply and is obtained from the 60-cycle 118 volt source 10. Half wave rectification of the supply is obtained by the diode $D_1$. The receiver is, in effect, switched on and off by the silicon control rectifier identified as SCR. The negative voltage pulses received from the transmitter are shorted to ground through diode $D_2$ while the positive pulses are operative to gate the SCR on with the lead 20 being connected to the gate of the SCR. Once it is gated on the SCR completely losses control and the SCR conducts until its anode to cathode voltage is reduced to a very low value. Accordingly since the pulse output of the transmitter has a randomly varying repetition rate the SCR is gated on at a randomly varying repetition rate thus resulting in providing a driving signal in the receiver which varies at a random repetition rate. This random signal or random current flow through the receiver is applied to the load relay $R_L$ which, when energized, may cause suitable contacts to actuate an alarm or any other desired equipment. Connected across this load relay is holding capacitor $C_5$ which is effective to store up a sufficient charge to maintain the relay closed during the short intervals when no current is flowing through the receiver with $R_L$ and $C_5$ forming a tank circuit. Thus the relay is continuously engaged as long as the randomly varying pulse signal output of the transmitter is received by the receiver. The $R_L$, $C_5$ network acts an integrator with regard to the driving signal produced in the receiver providing partial integration of this signal. FIG. 3A illustrates in solid lines the driving pulse produced through the triggering of the SCR while the dotted line wave form illustrates the partial integration of this driving signal that is produced by the $R_L$, $C_5$ network.

It should be noted that the random repetition rate of the driving signal produced in the receiver through the switching action of the SCR is not identically the same as the random repetition rate of the pulses produced in the transmitter of FIG. 1 (lightly loaded) although the random repetition rate of both of these signals is a relatively low value. This difference in repetition rate is a result of the SCR losing control insofar as the gate is concerned once the SCR is gated on. Thus, not withstanding that there may be two voltage spikes produced in the transmitter for one half wave of the supply voltage or in other words one half of the period of the supply voltage, the first spike will gate the SCR on, and the second spike will accordingly have no effect. This is obvious from a comparison of FIGS. 2 and 3A wherein the second voltage pulse from the left in FIG. 3A corresponds with two voltage spikes riding on the voltage supply of the transmitter. It is found that in operation while sensing a flame satisfactory results can be obtained with circuit parameters to produce a partially integrated driving signal which has an oscillation (dotted lines FIG. 3) generally between 3- and 15-cycles per second.

With the flame detector of this invention it is only necessary that the UV tube be mounted on the furnace and accordingly subjected to the severe operating conditions with relation to temperature, vibration, etc., existing at this location. The UV tube may be connected to the remaining components of the receiver through a two-wire coaxial cable which may be more than 500 feet in length. The coupling of the output signal of the transmitter to the input of the receiver may be through a two-wire coaxial cable that may be more than 200 feet in length thereby permitting the receiver to be located where desired.

While the transmitter of the flame detector is fail-safe as previously described, if the SCR in the receiver should short $R_L$ would be activated by the supply potential. For safety of operation an indication should be provided when the output signal of the receiver is of the uniform repetition rate of the supply. This may be accomplished by providing an indicator means or the like selectively responding to either the randomly varying output signal produced during normal operation while sensing a flame or the uniformly varying supply potential.

In the embodiment of FIG. 1 there is provided a network connected across $R_L$ which selectively responds to the random oscillation (3 to 15 c.p.s.) of the driving signal developed across $R_L$ and actuates a suitable signal during the presence of and/or during the absence of such random oscillation. This network includes bridge rectifier 26, the branch terminals of which are connected across $R_L$ with capacitor $C_{12}$ and inductor $L_1$ forming a series resonant circuit having a relatively low Q so as to provide a relatively broad band pass filter that is tuned to permit passage of the low frequency oscillation, such as approximately 3 to 15 c.p.s. while blocking higher and lower frequencies. The bridge rectifier 26 has connected across the center terminal of its branches relay 28 with capacitor $C_{14}$ and adjustable resistor $R_{10}$ being in parallel with this relay; the resistor adjusting the sensitivity of the relay, and the capacitor integrating the signal applied to the relay and maintaining the relay activated so long as the 3 to 15 c.p.s. signal is applied across the branch terminals of the bridge rectifier. Thus relay 28 will be energized as long as the random oscillation across the load is present. The relay 28 will be de-energized if there is no flame or if through a failure of a component of the system, the randomly varying signal is not conveyed through the system to the output. Upon de-energization of the relay 28 a switch may be closed to activate an alarm, indicating a malfunction of the system. This is shown in the drawing as relay contacts 30 which are connected into a circuit that includes the potential source 32 and indicator 34, which may be a light or sound device, so that when relay 28 is energized contacts 30 will be open and thus indicator 34 will be deactivated. De-energization of relay 28 will cause closing of contacts 30 and activation of the indicator 34. Since this indicator 34 is to indicate a malfunction, it is not desired to have it activated when the circuit is shut down or when a flame is not present as for instance when the furnace with which the flame detector is associated is out of operation. Thus there is also connected into the circuit of the indicator 34 the contacts 36 which are activated by means of the load relay $R_L$. When the relay $R_L$ is activated, it will cause the contacts 36 to close and thus the indicator may be controlled by the relay 28 as previously mentioned. When the relay $R_L$ is deactivated, the contacts 36 will open and thus the alarm circuit is rendered inoperative at this time. It should be noted that this indicator network provides an indication not only as to proper operation of the SCR but all essential components of the flame detector circuit since all must be functioning properly to give the randomly oscillating signal. While the most advantageous location for the indicator network is across the load relay $R_L$, it may be located in other portions of the receiver and a separate impedance may be provided in the receiver across which this indicator network may be connected and the low frequency A.C. filtered from the receiver and coupled into the indicator network, thus eliminating $R_L$ entirely and using relay 28 only. Those versed in the art may readily see that the relay can be eliminated for use with computers and other logic systems.

Figure 4:
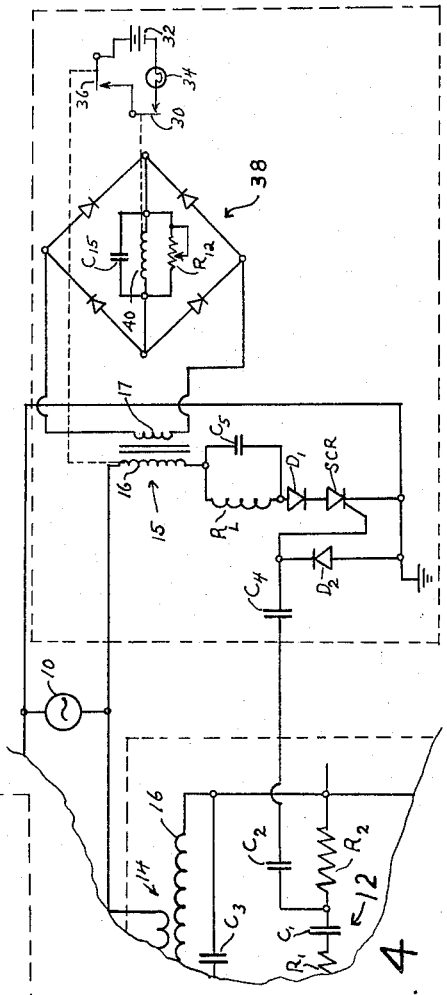
FIG. 4 illustrates a modified arrangement for testing operation of the circuit.

In the embodiment of FIG. 4 there is provided in the output of the receiver a network that selectively responds to the frequency of the source and including a transformer 15 the primary 16 of which is connected into the output circuit of the receiver and the secondary 17 of which is connected across the branch terminals of bridge rectifier 38. This bridge rectifier has connected across the center terminal of its branches relay 40 with capacitor $C_{15}$ and adjustable resistor $R_{12}$ in parallel with this relay; the resistor adjusting the sensitivity of the relay and the capacitor acting as a holding capacitor for the relay. The transformer and other components of this network have characteristics such that relay 40 is de-energized when the output of the receiver is said signal having a random repetition rate but is energized when it is the frequency of the supply voltage of the receiver as would be the case if the SCR was shorted. The relay 40 may be operative to actuate a suitable alarm device such as the arrangement shown, which is identical with that shown associated with relay 28. Thus with this FIG. 4 network an indication is provided that the output of the receiver is not varying randomly but is varying in accordance with the supply frequency thereby indicating a fault.

While a particular receiver circuit has been shown and described in the preferred embodiment of FIG. 1, other receiver circuit designs may be employed with several modified receiver designs being set forth in my co-pending application filed on November 2, 1962, Serial No. 235,098, under the title of "Flame Detector." The criterion with regard to the receiver design is that the output signal produced incident to receipt of the random output of the transmitter has a random repetition rate that is substantially less than the frequency of the supply of the receiver and such that it can be applied across a load and partially integrated so the load is activated with the signal thereacross being maintained above the level required to activate the load but varies above this level between an upper and a lower limit. For instance in a high voltage receiver circuit such as that of FIG. 1 employing a high voltage relay the voltage across the relay may vary, for example, from 80 to 150 volts with the variation being at a random rate but since the relay requires a considerably less potential than 80 volts, such as 45 volts, to pull in and 25 volts to drop out, the relay will be maintained engaged as long as the output signal of the transmitter is coupled into the receiver.

In the event that there is a flame out and the transmitter signal thus terminated the load relay of the receiver will "drop out" in a fraction of a second. Tests have shown that the relay drop out time may be between .1 and 1.5 seconds after a sudden and complete loss of flame. The amount of time after flame out to obtain a flame out indication at the receiver load, or in other words to obtain drop out of the relay, will depend upon the circuit components and primarily the capacitors with the design being such as to maintain drop out in a very short period of time.

In the operation of flame detectors it is desired that the sensing element respond only to energy emitted by the flame and not other energy sources such as the energy admitted by hot refractory or hot tubes or glowing carbon that may be in the vicinity of the flame. Accordingly, the detector of the present invention employing a glow discharge sensing tube utilizes a tube which responds to energy that lies generally within the spectrum range of 2000 to 3300 angstroms. Within this range the sensing tube will respond to photons admitted by the flame and will not respond to energy emitted from other sources such as glowing refractory. The wave lengths of the photons emitted by these other sources are somewhat above 3300 angstroms. Accordingly, the sensing tube operates in the ultraviolet spectrum range. In this designated range, i.e., between 2000 and 3300 angstroms, there exists a serious problem with regard to the detection of flames produced by burning of coal. The energy emitted from the coal fire in this spectrum range is rather limited being much less than that obtained with gas or oil fires and, accordingly, in order to detect coal fires by means of a glow discharge tube operating within this general spectrum, it is necessary that a very sensitive system be employed with so-called ultraviolet flame detectors of prior art design and as employed prior to applicant's invention being incapable of satisfactory operation with coal fires.

As explained hereinbefore when the UV tube is lightly loaded it is very sensitive, producing avalanches from relatively low energy photons and with the tube recovering after each such avalanche. By utilizing the flame detector circuit of this invention with the UV tube not being heavily loaded, it has been possible to detect the presence or absence of flame in a coal fire installation in an entirely satisfactory manner with the result being accurate and dependable. Accordingly, with the invention there is provided a flame detector system which operates satisfactorily on either gas, oil or coal firing and which is selectively responsive with regard to the energy spectrum range over which it is sensitive so that false indications of the presence of a flame are avoided.

The load as identified as $R_L$ in the various receiver circuits may take a variety of forms. It may be a relay which can operate a switching mechanism such as closing a switch when energized to provide an alarm either audible or visible or open a switch when energized and close a switch when de-energized to activate a suitable alarm. A relay may open one switch when energized and close another upon de-energization closing said one switch and opening said other switch with indicators being energized upon closing of the respective switches. Furthermore, the $R_L$ may not be a relay at all but rather may be the input load to a computer or signal static device, not requiring an intermediate relay. Still further, the $R_L$ may be a plurality of loads for instance relays, computers, lights, etc., all driven simultaneously from the same receiver.

While the potential source for the transmitter and receivers, as described hereinbefore, is stated to preferably be a 60-cycle per second source, this is by way of example only and is utilized merely because of its ready availability. It will be understood that the source for the transmitter and receiver may be any desired frequency so long as proper operation of the components of the circuits, for example the tube of the transmitter and the SCR of the receiver, may be obtained and so long as the period of the source is substantially longer (many times) than the time duration of the pulse produced in the circuit incident to avalanche (well over a millisecond) occurring in the tube so that the signal separator network can separate the pulse signal train from the A.C. source. From known pulse techniques it is considered that a difference of ten to one is desirable and will provide for ease of separation of the signals. In other words the effective frequency of the pulse should be ten times the frequency of the supply. It should be noted that with the tube lightly loaded so that it immediately returns to its high impedance state after avalanche, the source for the transmitter may be a D.C. potential although for ease of circuit design an A.C. source is preferred.

Accordingly, with the present invention there is provided a flame detector utilizing a glow discharge tube as the sensing element and having a circuit which is simple and reliable and safe in its operation with the detector being considerably more sensitive than so-called "UV" flame detectors of heretofore known design and with it being necessary to mount only the detector tube on the furnace within which the flame is to be detected.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A flame detector including an electric circuit having a glow discharge sensing tube operating out of saturation generating pulses incident to avalanche occurring in the tube, means selectively responsive to said pulse signals operative to produce an output signal of random repetition rate and means providing an indication when the output signal is of a frequency different from the randomly varying frequency.

2. The detector of claim 1 wherein the glow discharge tube is lightly loaded so that it recovers after each avalanche.

3. The detector of claim 1 wherein said tube has a supply potential continuously varying between a predetermined low and a predetermined maximum value and said circuit includes a signal separator network operative to separate the pulse signals from the supply potential of the tube.

4. The detector of claim 1 wherein said circuit includes an integrating network to increase the time duration of the pulse signal.

5. The detector of claim 1 wherein the first mentioned means includes a receiver circuit, means coupling said pulse signals into the receiver circuit as the input and means in the receiver circuit operative to convert said pulse signals into a driving signal.

6. An electric flame detector including a transmitter having a glow discharge sensing tube operating out of saturation and producing an output pulse signal incident to avalanche and having a random repetition rate, a receiver having an input and an output and provided with an A.C. supply having a repetition rate greater than said random rate, means coupling said output pulse signal of the transmitter into the receiver as the input with the receiver producing at its output a driving signal having a random repetition rate, and means providing an indication when the output signal is of a repetition rate greater than the random repetition rate.

7. The detector of claim 6 wherein the receiver includes a silicon controlled rectifier that is effectively gated on in response to the random output of the transmitter.

8. The detector of claim 6 wherein there is provided in the output of the receiver an integrating network operative to partially integrate said output signal producing a signal varying in amplitude at a randomly varying frequency, and a filter network connected across said integrator network responding selectively to the band of frequencies embracing the randomly varying frequencies and providing an indication of the presence or absence thereof.

9. A flame detector comprising in combination a first circuit connected to a source of potential, a glow discharge tube forming a part of said circuit and having the characteristic that in operation it fires at a randomly varying repetition rate thereby producing pulse signals in said first circuit, means filtering said pulse signals from said first circuit, a second circuit connected to a source of potential and receiving as its input signal the pulses thus filtered from said first circuit, means forming a part of said second circuit receiving said pulse signal and operative to effect a randomly varying switching operation in response thereto thereby producing in said second circuit a randomly varying signal, integrating means forming a part of said second circuit operative to partially integrate this last-named signal and including a load to which the partially integrated signal is applied with the signal being effective to activate said load and with the partially integrated signal having a minimum value effective for this purpose and oscillating randomly between minimum and maximum limits, filter means tuned to said randomly varying oscillation frequency and means to which this filtered signal is applied operative to provide an indication of the existence thereof.

10. An electric flame detector system comprising a transmitter circuit to which is applied a potential and which includes a glow discharge sensing tube operating out of saturation and producing, as a result of avalanche and incident to sensing a flame, pulse signals at a random repetition rate riding on said supply and having a time duration substantially less than the period of the supply, means separating said pulses from said supply, a receiver circuit to which is applied a supply potential of repetitiously varying magnitude with a frequency greater than that of the random signal and into the input of which circuit is coupled said separated pulses as the receiver input signal, said receiver circuit including means operative incident to receipt of said input signal to produce an output driving signal the repetition rate of which varies randomly and means responsive to the receiver output operative to provide an indication when the output signal is of a frequency corresponding with the receiver supply frequency thereby indicating a fault in the detector system.

11. The detector system of claim 10 where there is provided in the output of the receiver a relay across which is connected a holding capacitor for partially integrating the driving signal with the integrated signal varying at a random frequency and a filter network connected across the load tuned to the frequency range covered by the random frequencies and including means activated when the said random frequencies are present and deactivated when not present.

12. The detector of claim 10 including frequency sensitive means associated with the receiver output including means activated when the output frequency of the receiver corresponds with the supply and deactivated when less than said supply.

13. An electric flame detector system having an input and an output and comprising electric circuit means including a glow discharge sensing tube operating out of saturation said circuit being operative, incident to a pulse signal being produced as a result of avalanche occurring in the tube, to produce a signal at the output of said system that has a random frequency variation, a source of potential for said circuit varying between predetermined values at a predetermined rate with the repetition rate being greater than that of the randomly varying output signal, means providing an indication when the output signal is of a frequency different from the randomly varying signal, this last-named means comprising a network including means forming part of the first-mentioned means rendered operative when the frequency of the output is at least equal to the supply frequency but inoperative when below said supply frequency.

14. The detector of claim 13 wherein said network includes a load that is transformer coupled to the output of the system and that is activated when the frequency of the output is that of the supply but inoperative when below the supply.

15. A flame detector comprising in combination a first electric circuit connected to a source of potential, a glow discharge tube forming part of this circuit and having the characteristic that in operation it fires at a randomly varying repetition rate thereby producing pulse signals in said first circuit, a second circuit connected to a source of potential varying between predetermined values at a predetermined frequency, means coupling the pulse signals produced in said first circuit into said second circuit as the input therefor, means forming part of said second circuit receiving said pulse signal and effective to provide at the output of said second circuit an amplified randomly varying signal, a load in the output of said second circuit to which this last-named signal is applied for actuation thereof, circuit means at the output of said second circuit effectively tuned to the frequency of the supply of said second circuit, said circuit means including means energized when the signal in the output of said second circuit varies at the rate of supply of said second circuit but otherwise de-energized.

References Cited by the Examiner

UNITED STATES PATENTS

| | | | |
|---|---|---|---|
| 2,807,008 | 9/1957 | Rowell | 340—228 |
| 3,041,458 | 6/1962 | Roxberry | 315—134 |
| 3,205,359 | 9/1965 | Giuffrida | 250—83.3 |

ARTHUR GAUSS, *Primary Examiner.*

R. H. EPSTEIN, *Assistant Examiner.*